US012670930B2

(12) United States Patent
Guo et al.

(10) Patent No.: US 12,670,930 B2
(45) Date of Patent: Jun. 30, 2026

(54) MAGNETIC RECORDING MEDIUM WITH PLATINUM-DOPED CO-BN CAPPING LAYER AND MAGNETIC RECORDING APPARATUS FOR USE THEREWITH

(71) Applicant: Western Digital Technologies, Inc., San Jose, CA (US)

(72) Inventors: Wei Guo, Santa Clara, CA (US); Kyongha Kang, Fremont, CA (US); Ge Xu, San Jose, CA (US); Paul Christopher Dorsey, Los Altos, CA (US); Jaiyoung Kim, San Ramon, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/738,257

(22) Filed: Jun. 10, 2024

(65) Prior Publication Data

US 2025/0378850 A1     Dec. 11, 2025

(51) Int. Cl.
| | |
|---|---|
| *G11B 5/712* | (2006.01) |
| *G11B 5/84* | (2006.01) |
| *G11B 5/00* | (2006.01) |

(52) U.S. Cl.
CPC ...... *G11B 5/712* (2013.01); *G11B 2005/0021* (2013.01)

(58) Field of Classification Search
CPC .......... G11B 2005/0021; G11B 5/7375; G11B 5/7369; G11B 5/65; G11B 5/656; G11B 5/667; G11B 5/1278; G11B 5/653; G11B 5/66; G11B 5/73; G11B 5/7366; G11B 5/7379; G11B 5/73917; G11B 11/10589; G11B 13/08; G11B 27/36; G11B 5/314;
(Continued)

(56) References Cited

U.S. PATENT DOCUMENTS

| | | | |
|---|---|---|---|
| 7,052,757 B2 | 5/2006 | Chaiken et al. | |
| 8,947,987 B1 | 2/2015 | Wang et al. | |

(Continued)

OTHER PUBLICATIONS

English Machine Translation: Kosho et al. (WO 2023/079856).*
(Continued)

*Primary Examiner* — Holly Rickman
*Assistant Examiner* — Linda N Chau
(74) *Attorney, Agent, or Firm* — LOZA & LOZA, LLP; Gabriel Fitch

(57) ABSTRACT

Various apparatuses, devices, methods, and media are disclosed for heat-assisted magnetic recording (HAMR) that, in some examples, provide a HAMR medium with a platinum-doped CO—BN capping layer. In one example, the HAMR medium includes a CoPtBN capping layer on a magnetic recording layer with Pt in the range of 5-12 atomic percentage (at. %). An atomic ratio of Co to Pt within the CoPtBN may be, e.g., in the range of 5 to 13. The BN in the CoPtBN may be, e.g., 22-30 mole percentage of the CoPtBN. The CoPtBN may have a face-centered cubic (FCC) crystalline structure. The HAMR medium may have various other layers, such as a substrate, a heatsink layer on the substrate, and a seed layer on the heatsink layer, with the magnetic recording layer on the seed layer. The seed layer may include MgO or MgO—TiO. An amorphous soft underlayer (SUL) may be provided.

24 Claims, 8 Drawing Sheets

300

(58) Field of Classification Search
CPC ........... G11B 5/40; G11B 5/49; G11B 5/6088;
G11B 5/62; G11B 5/658; G11B 5/70621;
G11B 5/708; G11B 5/72; G11B 5/725;
G11B 5/7257; G11B 5/727; G11B
5/73921; G11B 5/82; G11B 5/8404
See application file for complete search history.

(56) References Cited

U.S. PATENT DOCUMENTS

| | | | |
|---|---|---|---|
| 9,159,350 B1 | 10/2015 | Wang et al. | |
| 9,779,771 B1 | 10/2017 | Wang et al. | |
| 9,886,977 B1 | 2/2018 | Mryasov et al. | |
| 10,950,267 B1 | 3/2021 | Aoki et al. | |
| 11,074,934 B1 * | 7/2021 | Yuan .................... | G11B 5/7375 |
| 2016/0099017 A1 * | 4/2016 | Hellwig ............... | G11B 5/7379 |
| | | | 428/839.1 |
| 2018/0350399 A1 * | 12/2018 | Zambano ............... | G11B 5/678 |
| 2020/0075053 A1 * | 3/2020 | Fukushima ....... | G11B 11/10536 |
| 2020/0234730 A1 * | 7/2020 | Ogino ................. | C23C 14/3414 |
| 2022/0122635 A1 | 4/2022 | Tham et al. | |
| 2023/0238023 A1 | 7/2023 | Trinh et al. | |

OTHER PUBLICATIONS

Tham, Kim Kong et al., "Proposal of Granular-Type Cap Layer with
High-Ku CoPt Grains and Ferromagnetic Oxide Grain Boundaries
for Full Granular Media", IEEE Transactions on Magnetics; vol. 55,
Issue 7; Jul. 2019; https://ieeexplore.ieee.org/document/8640849; 5
pages.

* cited by examiner

300

| | |
|---|---|
| 322 | Lubricant |
| 320 | Carbon Overcoat (COC) |
| 318 | CoPtBN Capping Layer with Pt in the range of 5-12 mole percentage, such as 58Co-12Pt-30BN, 65Co-5Pt-30BN, or 68Co-10Pt-22BN, and having a face-centered cubic (FCC) crystalline structure |
| 316 | FePt Magnetic Recording Layer(s) (MRL) |
| 314 | Seed Layer (which may include MgO and MTO layers) |
| 310 | Heatsink Layer |
| 308 | Soft Underlayer (SUL) or other amorphous underlayer |
| 304 | Adhesion Layer |
| 302 | Substrate |

400

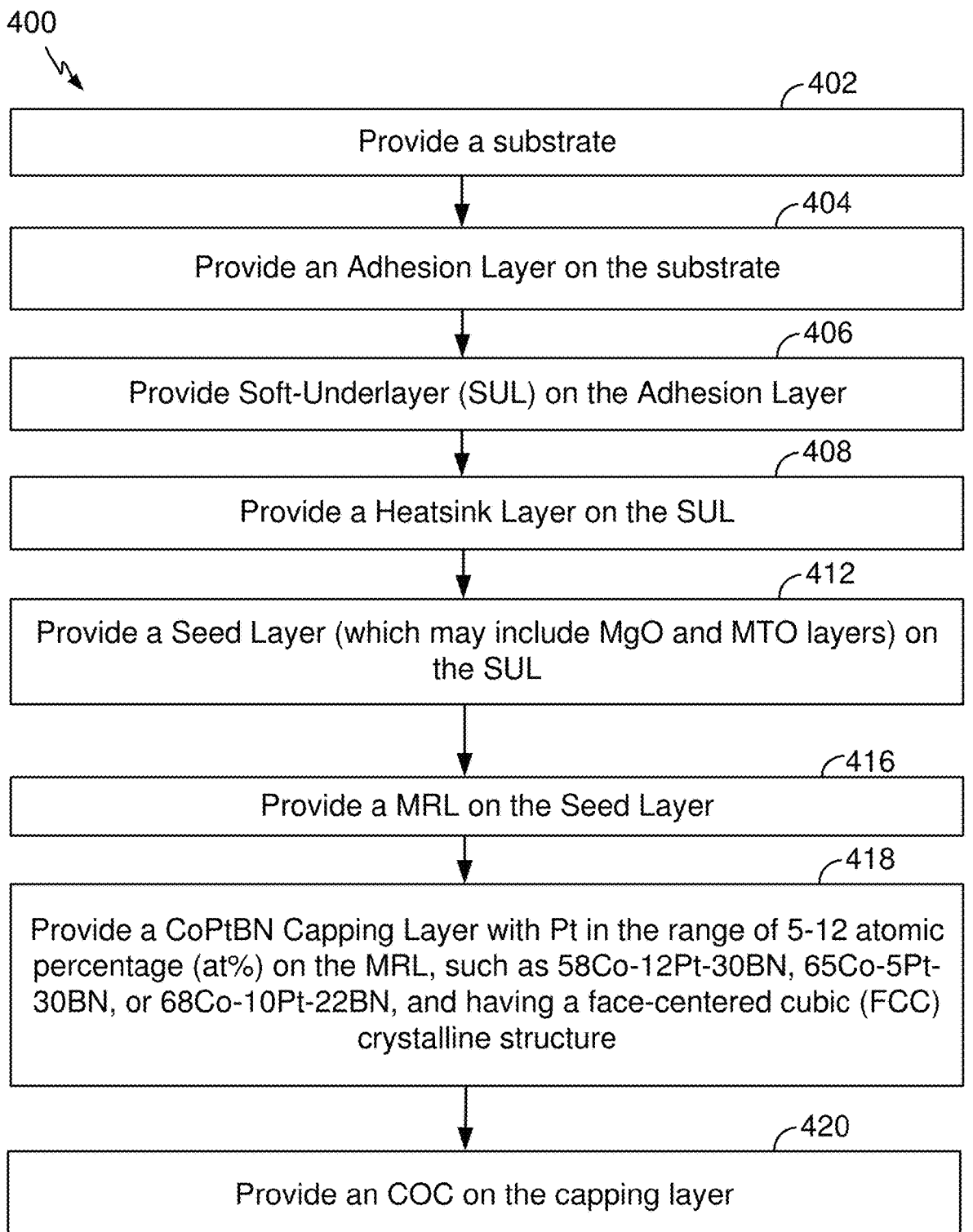

402

Provide a substrate

404

Provide an Adhesion Layer on the substrate

406

Provide Soft-Underlayer (SUL) on the Adhesion Layer

408

Provide a Heatsink Layer on the SUL

412

Provide a Seed Layer (which may include MgO and MTO layers) on the SUL

416

Provide a MRL on the Seed Layer

418

Provide a CoPtBN Capping Layer with Pt in the range of 5-12 atomic percentage (at%) on the MRL, such as 58Co-12Pt-30BN, 65Co-5Pt-30BN, or 68Co-10Pt-22BN, and having a face-centered cubic (FCC) crystalline structure

420

Provide an COC on the capping layer

FIG. 4

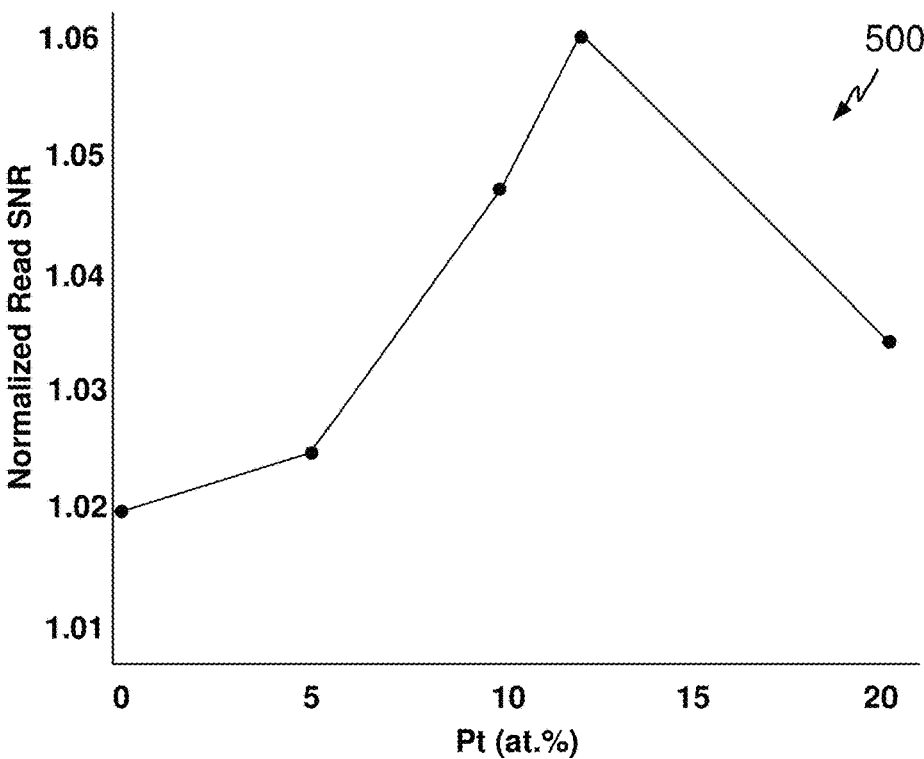
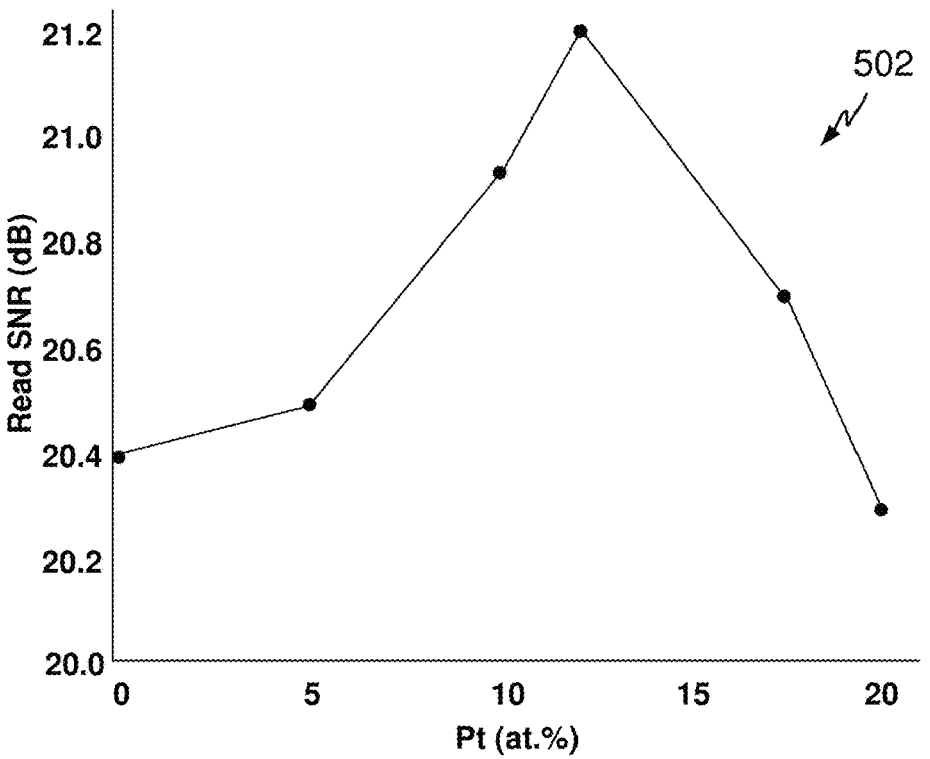
FIG. 5

600

610 — Capping layer on the magnetic recording layer, the capping layer including CoPtBN with Pt in the range of 5-12 atomic percentage (at%)

608 — Magnetic Recording Layer (MRL) on the seed layer

606 — Seed layer on the heatsink layer

604 — Heatsink Layer on the substrate

602 — Substrate

700

710 — Capping layer on the magnetic recording layer, the capping layer including CoPtBN having a face-centered cubic (FCC) crystalline structure 708 — Magnetic Recording Layer (MRL) on the seed layer 706 — Seed layer on the heatsink layer 704 — Heatsink Layer on the substrate 702 — Substrate

800

802

Provide a substrate

804

Provide a heatsink layer on the substrate

806

Provide a seed layer on the heatsink layer

808

Provide a magnetic recording layer on the seed layer

810

Provide a capping layer on the magnetic recording layer, the capping layer including CoPtBN with Pt in the range of 5-12 atomic percentage (at%).

900

MAGNETIC RECORDING MEDIUM WITH PLATINUM-DOPED CO-BN CAPPING LAYER AND MAGNETIC RECORDING APPARATUS FOR USE THEREWITH

FIELD

The disclosure relates, in some aspects, to magnetic recording media and to magnetic recording apparatus for use with magnetic recording media. More specifically, but not exclusively, the disclosure relates to magnetic recording media with a platinum-doped Co—BN capping layer for use with heat-assisted magnetic recording (HAMR).

INTRODUCTION

Magnetic storage systems, such as a hard disk drive (HDD), are utilized in a wide variety of devices in stationary and mobile computing environments. Examples of devices that incorporate magnetic storage systems include data center servers, desktop computers, portable notebook computers, portable hard disk drives, high-definition television (HDTV) receivers, television set-top boxes, video game consoles, and portable media players.

A typical disk drive includes magnetic storage media in the form of one or more flat disks. The disks are generally formed of few main substances, namely, a substrate material that gives it structure and rigidity, a magnetic recording layer that holds the magnetic impulses or moments that store digital data, and media overcoat and lubricant layers to protect the magnetic recording layer. The typical disk drive also includes a read head and a write head, generally in the form of a magnetic transducer which can sense and/or change the magnetic moments stored on the recording layer of the disks.

Heat Assisted Magnetic Recording (HAMR) systems can increase the areal density of information recorded magnetically on various magnetic media. To achieve higher areal density for magnetic storage, smaller magnetic grain sizes (e.g., less than 6 nanometers (nm)) may be required. In HAMR, high temperatures are applied to the media during writing to facilitate recording to the small grains, which have by design high magnetic anisotropy. The high temperatures may be achieved using a near field transducer that is coupled to a laser diode of a slider of a HAMR disk drive.

At least some magnetic recording media for use with HAMR employ a capping layer over a granular magnetic recording layer that assists magnetization reversal of the magnetic grains in the granular magnetic recording layer. Aspects of the present disclosure are directed to configuring a capping layer to, e.g., improve the areal density capability (ADC) of the magnetic recording media or to achieve other advantages and improvements.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one embodiment, a magnetic recording medium is provided that includes: a substrate; a heatsink layer on the substrate; a seed layer on the heatsink layer; a magnetic recording layer on the seed layer; and a capping layer on the magnetic recording layer, wherein the capping layer comprises CoPtBN with Pt in the range of 5 to 12 atomic percentage (at. %).

In another embodiment, a method for fabricating a magnetic recording medium is provided. The method includes: providing a substrate; providing a heatsink layer on the substrate; providing a seed layer on the heatsink layer; providing a magnetic recording layer on the seed layer; and providing a capping layer on the magnetic recording layer, wherein the capping layer comprises CoPtBN with Pt in the range of 5 to 12 atomic percentage (at. %).

In another embodiment, a magnetic recording medium is provided that includes: a substrate; a heatsink layer on the substrate; a seed layer on the heatsink layer; a magnetic recording layer on the seed layer; and a capping layer on the magnetic recording layer, wherein the capping layer comprises CoPtBN with a face-centered cubic (FCC) crystalline structure.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which:

FIG. 4 is a flowchart of an exemplary process for fabricating a HAMR medium that includes, among other layers, a CoPtBN capping layer with Pt in the range of 5-12 at. % with an FCC crystalline structure, in accordance with an aspect of the disclosure.

FIG. 5 includes graphs showing exemplary experimental results for various HAMR media designs, configured in accordance with aspects of the disclosure, including graphs showing read signal-to-noise ratios (SNRs) for various Pt at. % values within CoPtBN.

DETAILED DESCRIPTION

Figure 1:
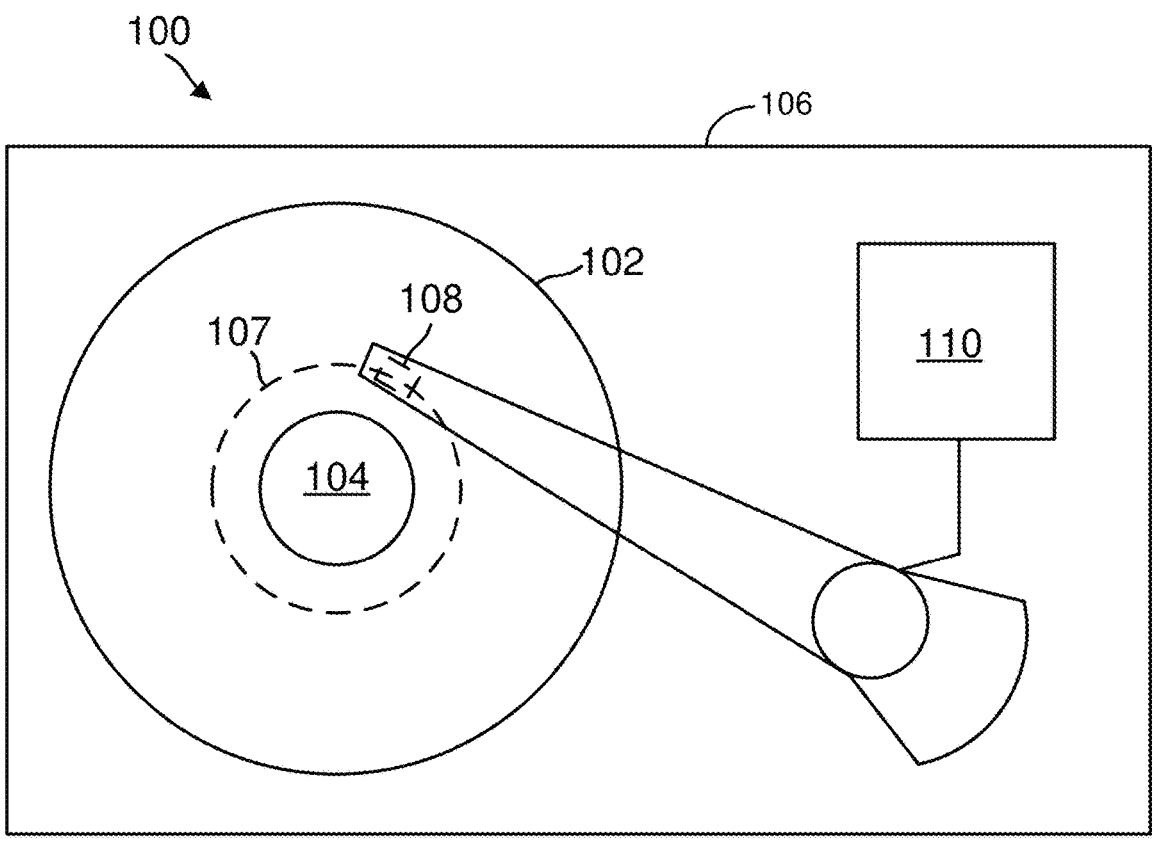
FIG. 1 is a top schematic view of an exemplary disk drive configured for heat-assisted magnetic recording (HAMR) including a slider and a HAMR medium that includes a CoPtBN capping layer with Pt in the range of 5-12 atomic percentage (at. %) with a face-centered cubic (FCC) crystalline structure, in accordance with an aspect of the disclosure.

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to apparatuses, systems, methods, and media for providing a magnetic recording medium such as a Heat-Assisted Magnetic Recording (HAMR) medium that can, among other features, enhance a readback signal of the media to permit an increase in areal density capability (ADC) within its magnetic recording layers (MRLs) while also providing good layer deposition characteristics and other features. In some aspects, these features are achieved by employing a capping layer on an MRL, wherein the capping layer is CoPtBN with Pt in the range of 5-12 atomic percentage (at. %) and has a face-centered cubic (FCC) crystalline structure.

According to a Co—Pt phase diagram, when the Co/Pt atom ratio exceeds 3, the CoPt alloy tends to form a hexagonal close-packed (HCP phase) in the equilibrium state. When providing a CoPtBN capping layer with 5-12 at. % Pt, the Co/Pt atomic ratio is between about 5 and 13. With the Co/Pt atomic ratio between 5 and 13, the capping layer is expected to exhibit an HCP structure (at least when grown on an $L_{10}$-ordered FePt MRL). However, unexpectedly, the CoPtBN capping material was found to instead exhibit face-centered cubic (FCC) epitaxial growth (on top of the $L_{10}$-ordered FePt magnetic recording layer), which allows for more effective vertical exchange coupling between the CoPtBN and the FePt MRL below, enhancing the readback signal of the media. Moreover, this structure effectively aids in removing secondary FePt grains (i.e., grains with low magnetic anisotropy) at the MRL grain boundaries in a subsequent etching process with minimum etch damage.

More specifically, the use of 5-12 at. % Pt helps to prevent cap damage to the FePt recording grains during the etch process (where the etch is performed after the CoPtBN capping layer alloy is deposited). Note that the CoPtBN also has high-Ms, where Ms is the saturation magnetization (i.e., the maximum magnetic moment per unit volume for the material). Some Guzik tests have shown at least a 3% areal density capability (ADC) improvement.

Herein, a magnetic recording medium is provided that, in one aspect, includes: a substrate; a heatsink layer on the substrate; a seed layer on the heatsink layer; an MRL on the seed layer; and a capping layer on the magnetic recording layer, wherein the capping layer comprises CoPtBN with Pt in the range of 5-12 at. %. In another aspect, a magnetic recording medium is provided that includes: a substrate; a heatsink layer on the substrate; a seed layer on the heatsink layer; an MRL on the seed layer; and a capping layer on the magnetic recording layer, wherein the capping layer has an FCC crystalline structure.

In some examples, an atomic ratio of the Co to the Pt within the CoPtBN ranges from 5 to 13. The CoPtBN may be, for example, 58Co-12Pt-30BN, 65Co-5Pt-30BN, or 68Co-10Pt-22BN. The BN in the CoPtBN may be 22-30 mole percentage of the CoPtBN. The 22-30 mol. % BN serves as a segregant that can well separate the CoPt/FePt epitaxially grown grains and provide enough thermal isolation of the MRL grains. Less than 22 mole percentage of BN can degrade the thermal gradient of the HAMR media. Note that, in some aspects, the Co within CoPtBN is in the range of 58 to 68 mol. %, or in the narrower range of 60 to 66 mol. %. In some aspects, the BN within CoPtBN is in the range of 22 to 30 mol. %, or in the narrower range of 24 to 28 mol. % A carbon overcoat may be provided on the capping layer, with a lubricant on the overcoat. An amorphous underlayer, such as a soft-underlayer (SUL), may be provided between the substrate and the heatsink layer to provide a return path for magnetic flux from a magnetic recording head during a write operation. The seed layer may be, for example, MgO and MgO—TiO. The magnetic recording medium may be configured for HAMR.

ILLUSTRATIVE EXAMPLES AND EMBODIMENTS

FIG. 1 is a top schematic view of a data storage device 100 (e.g., disk drive or magnetic recording device) configured for magnetic recording and comprising a slider 108 and a magnetic recording medium 102. In illustrative examples, the magnetic recording medium 102 includes a HAMR medium that includes a CoPtBN capping layer (not shown in FIG. 1, but see FIG. 3) with Pt in the range of 5-12 atomic percentage (at. %) with an FCC crystalline structure. The laser (not visible in FIG. 1 but see 114 in FIG. 2) is positioned with a magnetic head/slider 108. Disk drive 100 may comprise one or more disks/media 102 to store data. Disk/media 102 resides on a spindle assembly 104 that is mounted to a drive housing 106. Data may be stored along tracks in the magnetic recording layer of disk 102. The reading and writing of data are accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104 and thereby rotates the disk 102 to position the head 108 at a particular location along a desired disk track 107. The position of the head 108 relative to the disk 102 may be controlled by the control circuitry 110 (e.g., a microcontroller). It is noted that while an exemplary HAMR system is shown, at least some aspects of the disclosure may be used in other HAMR or EAMR magnetic data recording systems or in non-HAMR or non-EAMR magnetic data recording systems, including shingle-written magnetic recording (SMR) media, perpendicular magnetic recording (PMR) media, or microwave assisted magnetic recording (MAMR) media.

Figure 2:
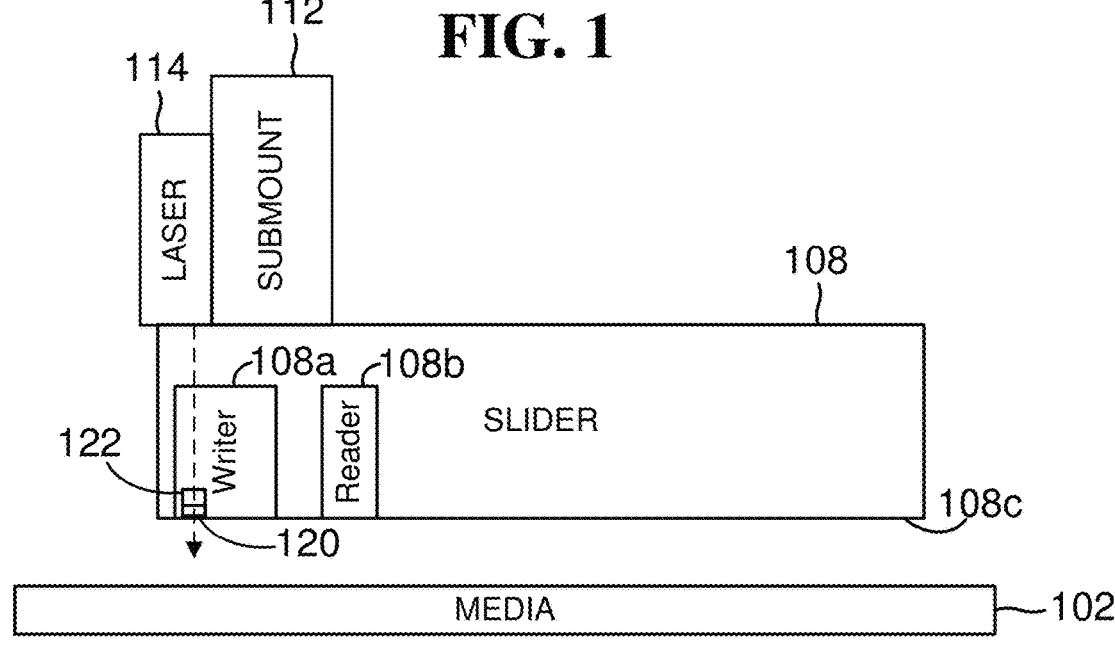
FIG. 2 is a side schematic view of the exemplary slider and HAMR medium of FIG. 1 in accordance with an aspect of the disclosure.

FIG. 2 is a side schematic view of the slider 108 and magnetic recording medium 102 of FIG. 1. The magnetic recording medium 102 includes a CoPtBN capping layer (not shown in FIG. 1, but see FIG. 3) with Pt in the range of 5-12 atomic percentage (at. %) with an FCC crystalline structure (not shown in FIG. 1 but see FIG. 3). The slider 108, which may also be referred to as a head, may comprise a sub-mount 112 attached to a top surface of the slider 108. The laser 114 may be attached to the sub-mount 112, and possibly to the slider 108. The slider 108 comprises a write element (e.g., writer) 108a and a read element (e.g., reader) 108b positioned along an air bearing surface (ABS) 108c of the slider for writing information to, and reading information from, respectively, the media 102. In other aspects, the slider may also comprise a layer of Si or Si cladding 120. This layer is optional.

In operation, the laser 114 is configured to generate and direct light energy to a waveguide (e.g., along the dashed line) in the slider which directs the light to a near field transducer (NFT) 122 near the air bearing surface (e.g., bottom surface) 108c of the slider 108. Upon receiving the light from the laser 114 via the waveguide, the NFT 122 generates localized heat energy that heats a portion of the media 102 within or near the write element 108a. The anticipated recording temperature is in the range of about 350° C. to 400° C. In the aspect illustrated in FIG. 2, the laser directed light is disposed within the writer 108a and near a trailing edge of the slider. In other aspects, the laser directed light may instead be positioned between the writer 108a and the reader 108b. FIGS. 1 and 2 illustrate a specific example of a HAMR system. In other examples, the magnetic recording medium 102 can be used in other suitable HAMR systems (e.g., with other sliders configured for HAMR).

Figure 3:
FIG. 3 is a side schematic view of an exemplary HAMR medium that includes, among other layers, a CoPtBN capping layer with Pt in the range of 5-12 atomic percentage (at. %) with an FCC crystalline structure, in accordance with an aspect of the disclosure.

FIG. 3 is a side schematic view of an exemplary HAMR medium 300 that includes a CoPtBN capping layer with Pt in the range of 5-12 at. % with an FCC crystalline structure in accordance with an aspect of the disclosure. The HAMR medium 300 of FIG. 3 has a stacked structure with a substrate (which may be formed, e.g., of glass or a glass ceramic) 302 at a bottom/base layer, an adhesion layer 304 (which may be formed, e.g., of NiTa) on the substrate 302, an SUL 308 (which may be formed, e.g., of CoZrWMo) on the adhesion layer 304, a heatsink layer 310 (which may be formed, e.g., of Cr) on the SUL 308, a seed layer 314 (which may include MgO and MTO layers with the MgO layer on top of the MTO layer) on the heatsink layer 310, a magnetic recording layer (MRL) 316 on the seed layer 314, a CoPtBN capping layer 318 on the MRL 316, and a COC 320 on the capping layer 318. The MRL 316 may be formed, e.g., of FePt having an $L_{10}$-ordered structure, e.g., a high anisotropy $L_{10}$ FePt with segregants such as C, BN, $SiO_2$, Ag, and combinations thereof. The CoPtBN capping layer 318 may have Pt in the range of 5-12 at. % (such as 58Co-12Pt-30BN, 65Co-5Pt-30BN, or 68Co-10Pt-22BN) and may have an FCC crystalline structure (at least when on an $L_{10}$-ordered FePt magnetic recording layer). In some examples, the atomic ratio of the Co to the Pt within the CoPtBN is in the range of 5 to 13, or more precisely in the range of 4.83 to 13. In some examples, the BN in the CoPtBN comprises 22 to 30 mole percentage of the CoPtBN, with 30% preferred in some examples. Note that BN is added to, e.g., decrease exchange coupling among MRL grains. More specifically, 22 to 30 mole percentage BN (30 mol. % preferred) helps to decrease exchange coupling among MRL grains. Although not shown, an additional lubricant layer may be on the COC layer 320. Note that the layers in FIG. 3 (and in other figures herein) are not shown to scale.

The terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

In some aspects, the layers have the following thicknesses: the substrate 302 thickness is in the range of 0.5 mm to 0.635 mm; the adhesion layer 304 thickness is in the range of 45 nm to 180 nm; the SUL 306 thickness is in the range of 55 nm to 80 nm; the heatsink layer 310 thickness is in the range of 55 nm to 100 nm; the seed layer 314 thickness is in the range of 2 nm to 5 nm (and is made of MgO, or alternatively of MgO—TiO, or of other appropriate oxide layer that promotes FePt ordering and provides good thermal barrier resistance between the recording layer and the heatsink layer); the MRL structure that may be, e.g., 100-200 Å thick; the capping layer 318 thickness is in the range of 1 nm to 3 nm; the COC 320 thickness is in the range of 15 angstroms (Å) to 40 Å; the lubricant layer thickness (if provided) is in the range of 7 Å to 9.5 Å.

In some examples, substrate 302 has an outer diameter (i.e., OD) of about 97 mm and a thickness of about 0.5 mm. In other examples, the OD may be 95 mm or 95.1 mm. (Generally speaking, such disks are all referred to as "3.5 inch" disks.) In some aspects, the substrate 302 may be made of one or more materials such as an Al alloy, NiP-plated Al, glass, glass ceramic, and/or combinations thereof.

In some aspects, the adhesion layer 304 (which might alternatively be referred to as a pre-seed layer) is used to reduce delamination of layers or films deposited over the adhesion layer. The adhesion layer 304 may be a metallic alloy, such as NiTa (as shown), etc.

In some aspects, the SUL 308 may be configured with CoZrWMo. In other examples, the SUL 308 can be made of one or more other soft magnetic materials, such as Co, Fe, or Ni with one or more of W, Mo, Ta, Nb, Cr, B, Si, or C, or combinations thereof. Thus, in some aspects, the SUL 308 can be made of metallic materials such as CoZrWMo, CoW, NiFe, or CoNiFe, or combinations thereof. In some examples, additional non-metallic materials can be added to the metallic materials, such as CrTa or $ZrO_2$. In some examples, the SUL is formed of Co or CoFe alloys with Zr, B, Ta, W, and Mo additives (to make the layer soft magnetic and amorphous). The SUL 308 may be an amorphous compound with no anisotropy. The SUL 308 may be configured and positioned to support the magnetization of the magnetic recording layer structure 316 during data storage operations. More specifically, the SUL 308 may be configured and positioned to provide a first return path for a magnetic field applied during a write operation.

In some aspects, the heatsink layer 310 can be made of one or more materials such as Cr, as shown, or Ag, Al, Au, Cu, Mo, Ru, W, CuZr, MoCu, AgPd, CrRu, CrV, CrW, CrMo, CrNd, NiAl, NiTa, combinations thereof, and/or other suitable materials known in the art.

In some aspects, the seed layer 314 is used to create a growth template for the subsequently-deposited films including the heatsink layer 310 and the MRL 316 and to provide a correct crystallographic orientation, e.g., $L_{10}$. Functional goals for the seed layer 314 include small grain size and good crystallographic texture, both of which may be desirable for good media recording performance. In some aspects, the seed layer 314 may include an MTO layer to assist in nucleation so as to permit proper crystal growth within the MRL 316 so that the MRL 316 will have good crystallographic texture with small grains. In some aspects, the seed layer may include an MgO layer to assist in nucleation to permit proper crystal growth within the MRL 316 and to provide a thermal barrier in combination with an MTO layer.

In some aspects, the MRL 316 includes one or more magnetic recording layers for storing data magnetically, not explicitly shown in FIG. 3. For example, the MRL 316 may include magnetic recording sub-layers and exchange control sub-layers (ECLs). Collectively, the sub-layers form an MRL structure 316 that may be, e.g., 100-200 Å thick. In some aspects, the MRL 316 may be made of FePt. In some aspects, the MRL 316 may be made instead of an alloy selected from FePtY, where Y is a material selected from Cu, Ni, and combinations thereof. In other aspects, the MRL 316 may be made instead of a CoPt alloy. In some aspects, the MRL 316 may be formed of high anisotropy $L_{10}$ FePt with segregants such as C, BN, $SiO_2$, Ag, and combinations thereof. In some aspects, the MRL is a four layer MRL. Each layer of the MRL may have segregants with the amount of segregant varying from layer to layer within the MRL. If a lubricant layer is also provided on the COC 320, the lubricant layer (not shown in the figure) may be made of a polymer-based lubricant material.

In some aspects, the capping layer 318 can be a multi-layer structure having at least one capping layer as described above that is formed of CoPtBN with Pt in the range of 5-12 at. % with an FCC crystalline structure, along with one or more additional capping layer(s). The additional capping layer(s) may be made, e.g., of Co, CoPt, CoFe, or CoPd. In some embodiments, the additional capping layer(s) may be made of specific combinations of materials, for example, Co/Au, Co/Ag, Co/Al, Co/Cu, Co/Ir, Co/Mo, Co/Ni, Co/Os, Co/Ru, Co/Ti, Co/V, Fe/Ag, Fe/Au, Fe/Cu, Fe/Mo, Fe/Pd, Ni/Au, Ni/Cu, Ni/Mo, Ni/Pd, Ni/Re, etc. In additional examples, the additional capping layer(s) may include any combination of Pt and Pd (e.g., alloys), or any of the following elements, alone or in combination: Au, Ag, Al, Cu, Ir, Mo, Ni, Os, Ru, Ti, V, Fe, Re, and the like. In some aspects, the multi-layer structure of the capping layer includes two or more layers with CoPtBN, with different atomic percentages of the constituents of the CoPtBN, e.g., each with a different percentage of BN within the CoPtBN. For example, one sub-layer may be 58Co-12Pt-30BN, another sub-layer 65Co-5Pt-30BN, and yet another sub-layer may be 68Co-10Pt-22BN.

In some aspects, during media fabrication, the MRL 316 is deposited such that recording grains are formed of one or more magnetic materials (e.g., FePt) and grain boundaries are formed of one or more segregants (e.g., C, BN, $SiO_2$, Ag, or $TiO_2$). The capping layer 318 is then deposited on the MRL 316 such that capping grains are formed of one or more magnetic materials (e.g., CoFe or CoPt) on the MRL grains and capping boundaries are formed of one or more capping segregants on the MRL segregants. The MRL grains and the capping grains can present a fairly rough upper surface. To decrease the roughness caused by the grain formation, the capping layer 318 may be etched until at least some of its capping grains have been planarized. In some aspects, a sacrificial layer, not shown, may be used as well, which is deposited over the capping layer. The sacrificial layer may include, e.g., at least one of: C, SiO2, Al2O3, ZrO2, or TiO2 and may be etched away along with portions of the capping layer.

Notably, FIG. 3 illustrates an illustrative example of a HAMR stack with a particular combination and arrangement of layers. In other examples, more or fewer layers may be provided. For example, in some examples, the MTO or the adhesion layer might be omitted. In other examples, additional layers or films might be provided, such as a thermal resistive layer (which may be formed, e.g., of $RuAlTiO_2$) above the heatsink and below the MRL. Generally speaking, there may be various tradeoffs in different aspects of performance (e.g., thermal performance vs. magnetic performance) to the various arrangements.

FIG. 4 is a flowchart of a process 400 for fabricating a HAMR medium that includes a CoPtBN capping layer with Pt in the range of 5-12 at. % and with an FCC crystalline structure in accordance with some aspects of the disclosure. In one aspect, process 400 can be used to fabricate the HAMR media described above in relation to FIG. 3. In block 402, the process provides a substrate. In block 404, the process provides an adhesion layer (which may be formed, e.g., of NiTa) on the substrate. In block 406, the process provides an SUL on the adhesion layer (which may be formed, e.g., of CoZrWMo). In block 408, the process provides a heatsink layer (which may be formed, e.g., of Cr) on the SUL. In block 412, the process provides a seed layer (which may include MgO and MTO layers as discussed above) on the heatsink layer. In block 416, the process provides an MRL on the seed layer. The MRL may be formed, e.g., of FePt having an $L_{10}$-ordered structure, e.g., a high anisotropy $L_{10}$ FePt with segregants such as C, BN, $SiO_2$, Ag, and combinations thereof. In block 418, the process provides a CoPtBN capping layer on the MRL. The CoPtBN capping layer may have Pt in the range of 5-12 at. % (such as 58Co-12Pt-30BN, 65Co-5Pt-30BN, or 68Co-10Pt-22BN) and may have an FCC crystalline structure (at least when deposited on top of an $L_{10}$-ordered FePt magnetic recording layer). In some examples, the atomic ratio of the Co to the Pt within the CoPtBN is in the range of 5 to 13. In some examples, the BN in the CoPtBN comprises 30-50 percent by volume of the CoPtBN. In block 420, the process provides a COC on the capping layer and may then etch the COC. Note that, in some aspects, the CoPt of the capping layer forms capping layer grains (e.g., magnetic grains) and the BN of the capping layer forms segregants (e.g., non-magnetic segregants) disposed between the grains. In some examples, at least some the portions of the capping layer may be etched. Although not shown, the process may also provide a lubricant layer on the COC. Additional or alternative exemplary materials are listed above.

Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed. The deposition of at least some of the layers can be performed using any of a variety of deposition processes or sub-processes, including, but not limited to physical vapor deposition (PVD), sputter deposition and ion beam deposition, plasma enhanced chemical vapor deposition (PECVD) and other forms of chemical vapor deposition (CVD) besides PECVD, low pressure chemical vapor deposition (LPCVD) and atomic layer chemical vapor deposition (ALCVD). In other aspects, other suitable deposition techniques known in the art might also be used.

FIG. 5 illustrates exemplary read SNR values for a HAMR recording media having a CoPtBN capping layer with various atomic percentages (at. %) of Pt within the CoPtBN over a range of values from 0 at. % to 20 at. %. More specifically, graph 502 illustrates the normalized read SNR, and graph 504 illustrates the read SNR in db. Both graphs illustrate that the read SNR increases with increasing Pt at. % within the CoPtBN and peaks around 12 at. %. Above about 12%, the read SNR begins to drop with increasing Pt at. %. The choice of Pt at. % doping into the Co should be considered by adjusting a few parameters such as lattice mismatch and saturation magnetization (Ms). On one hand, pure Co has a saturation magnetization (Ms) of 1400 emu/cm$^3$ but has a lattice mismatch of >10% with FePt grains, which does not promote epitaxy growth on $L_{10}$ FePt. In this regard, 5-12 at. % Pt doping helps reduce a lattice mismatch to <9% between the capping layer and the FePt grains of the MRL (a=3.87 Å along the a-axis), which is preferred to maintain adequate epitaxy and smooth topology of cap layer growth. If ¿>9%, the elastic strain is relieved by the topology of the cap structure, often resulting in the formation of defects such as dislocations or low angle grain boundaries, which can adversely affect epitaxial growth. On the other hand, Pt doping to the Co dilutes the Ms of the cap core with a significant drop in Ms above about 12 at. % of Pt (~1324 emu/cm$^3$) in the CoPtBN capping layer and hence the Pt-overdoping to Co will degrade the read back signal/read SNR. Aside from these two parameters, Pt-over doping above 12 at. % will decrease the etching efficiency of low-Hk secondary grains during the following etching process. In summary, although read SNR can remain high for at least some Pt at. % values above 12 at. % (as shown in FIG. 5), other parameters can be adversely affected, and so 5-12 at. % Pt is preferred within the CoPtBN capping layer.

ADDITIONAL EXAMPLES AND EMBODIMENTS

Figure 6:
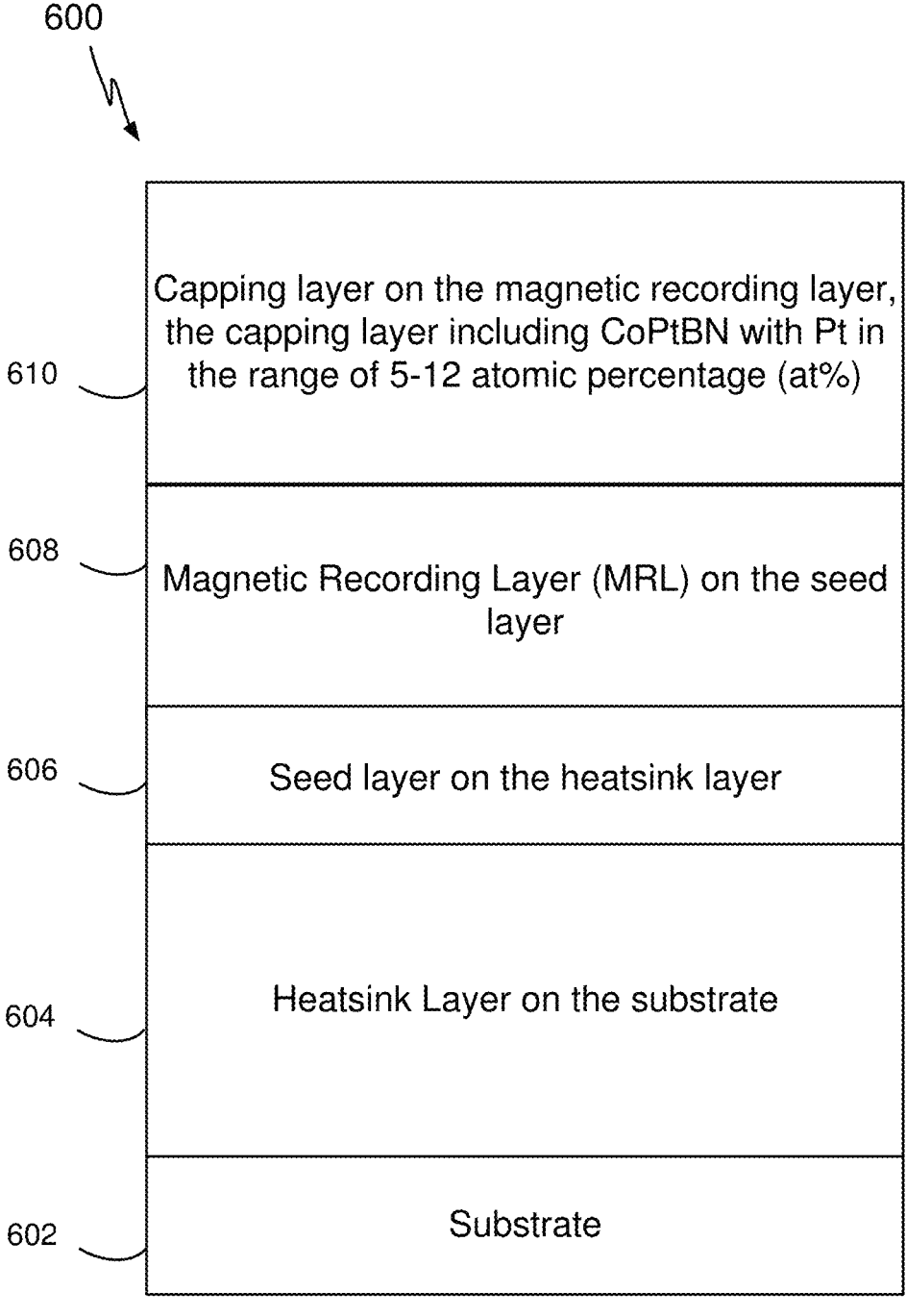
FIG. 6 is a side schematic view of an exemplary magnetic recording medium that includes a CoPtBN capping layer with Pt in the range of 5-12 at. %, in accordance with an aspect of the disclosure.

FIG. 6 is a side schematic view of an exemplary magnetic recording medium 600 in accordance with another aspect of the disclosure. The magnetic recording medium 600 has a stacked structure with a substrate 602, a heatsink layer 604 on the substrate 602, a seed layer 606 of the heatsink layer 604, and an MRL 608 on the seed layer 606. There is also a capping layer 610 on the magnetic recording layer with the capping layer including CoPtBN with Pt in the range of 5-12 at. %. The magnetic recording medium 600 may be a HAMR medium.

In some aspects, the substrate 602 may be made of one or more materials such as an Al alloy, NiP-plated Al, glass, glass ceramic, and/or combinations thereof. In some aspects, the heatsink layer 604 may be made of Cr. In some aspects, the seed layer 606 may include MgO and MTO. In some aspects, the MRL 608 may be formed of high anisotropy $L_{10}$ FePt with segregants. In some examples, the MRL 608 may include one or more magnetic recording layers, which are not explicitly shown in FIG. 6. In some aspects, the capping layer 610 may include one or more of 58Co-12Pt-30BN, 65Co-5Pt-30BN, and 68Co-10Pt-22BN. Additional layers of the medium 600 may be provided, as discussed above, such as an SUL, etc.

Figure 7:
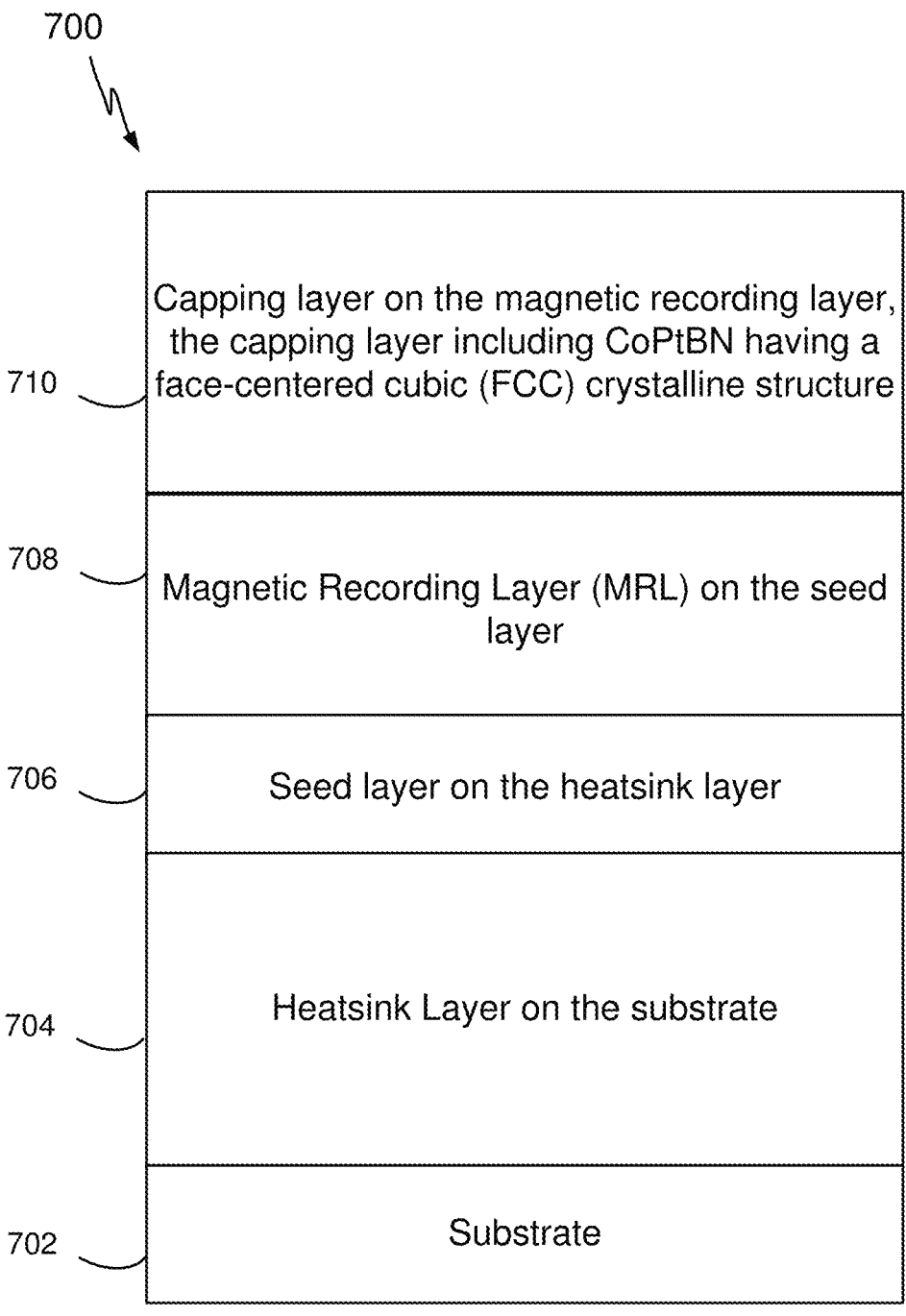
FIG. 7 is a side schematic view of an exemplary magnetic recording medium that includes a CoPtBN capping layer with an FCC crystalline structure, in accordance with an aspect of the disclosure.

FIG. 7 is a side schematic view of an exemplary magnetic recording medium 700 in accordance with another aspect of the disclosure. The magnetic recording medium 700 has a stacked structure with a substrate 702, a heatsink layer 704 on the substrate 702, a seed layer 706 of the heatsink layer 704, and an MRL 708 on the seed layer 706. There is also a capping layer 710 on the magnetic recording layer with the capping layer including CoPtBN having an FCC crystalline structure. The magnetic recording medium 700 may be a HAMR medium.

In some aspects, the substrate 702 may be made of one or more materials such as an Al alloy, NiP-plated Al, glass, glass ceramic, and/or combinations thereof. In some aspects, the heatsink layer 704 may be made of Cr. In some aspects, the seed layer 706 may include MgO and MTO. In some aspects, the MRL 708 may be formed of high anisotropy $L_{10}$ FePt with segregants. In some examples, the MRL 708 may include one or more magnetic recording layers, which are not explicitly shown in FIG. 7. In some aspects, the capping layer 710 may include one or more of 58Co-12Pt-30BN, 65Co-5Pt-30BN, and 68Co-10Pt-22BN. Additional layers of the media may be provided, as discussed above, such as an SUL, etc.

Figure 8:
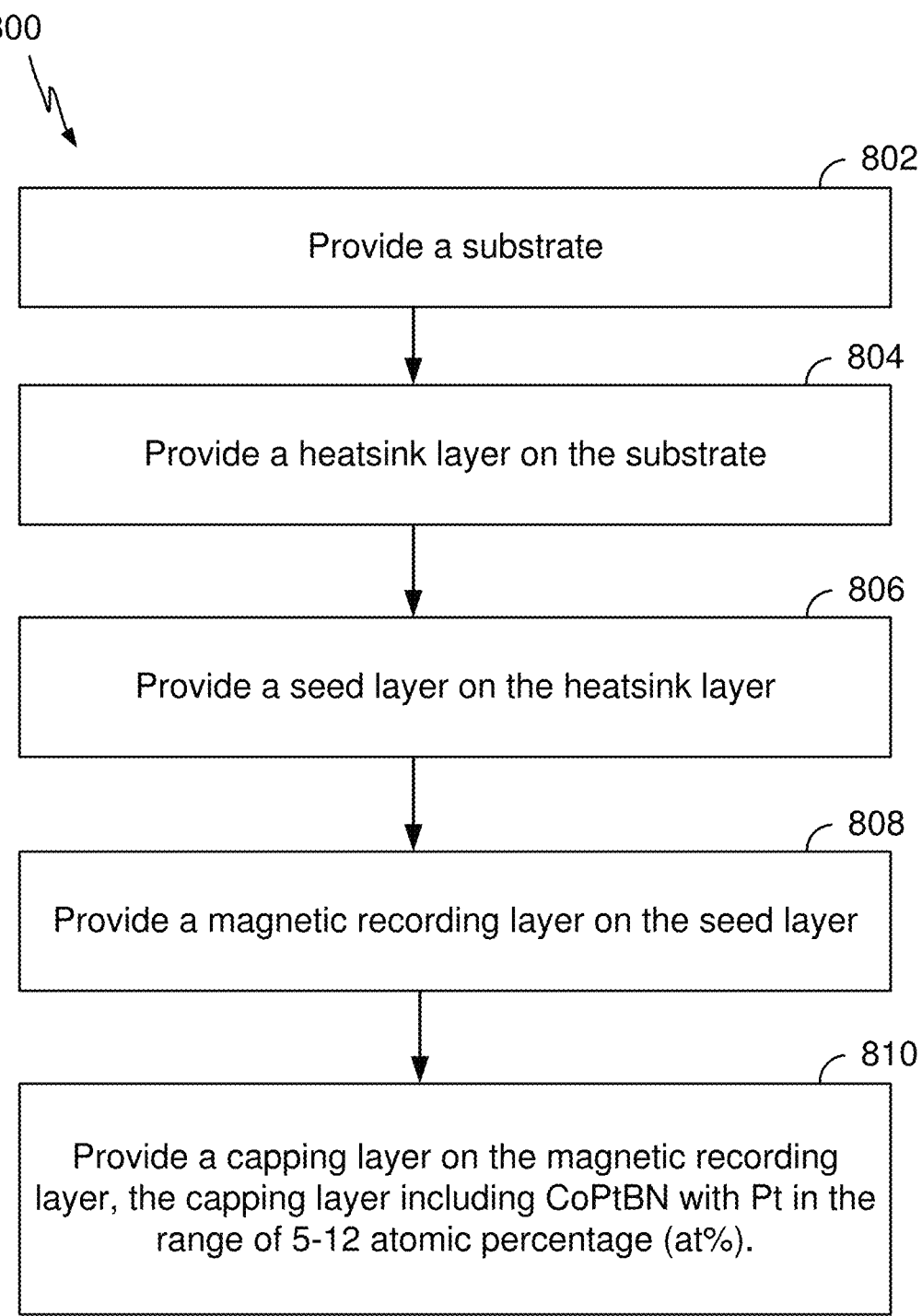
FIG. 8 is a flowchart of an exemplary process for fabricating a magnetic recording medium that includes a CoPtBN capping layer with Pt in the range of 5-12 at. %, in accordance with an aspect of the disclosure.

FIG. 8 is a flowchart of a process 800 for fabricating magnetic recording medium in accordance with some aspects of the disclosure. In one aspect, process 800 can be used to fabricate the media described above in relation to FIG. 6. In block 802, the process provides a substrate. In block 804, the process provides a heatsink layer directly on the substrate. In block 806, the process provides a seed layer on the heatsink layer. In block 808, the process provides an MRL on the seed layer. In block 810, the process provides a capping layer on the magnetic recording layer, wherein the capping layer includes CoPtBN with Pt in the range of 5-12 at. %. The medium that is fabricated may be a HAMR medium. In other examples, more or fewer layers may be provided.

Figure 9:
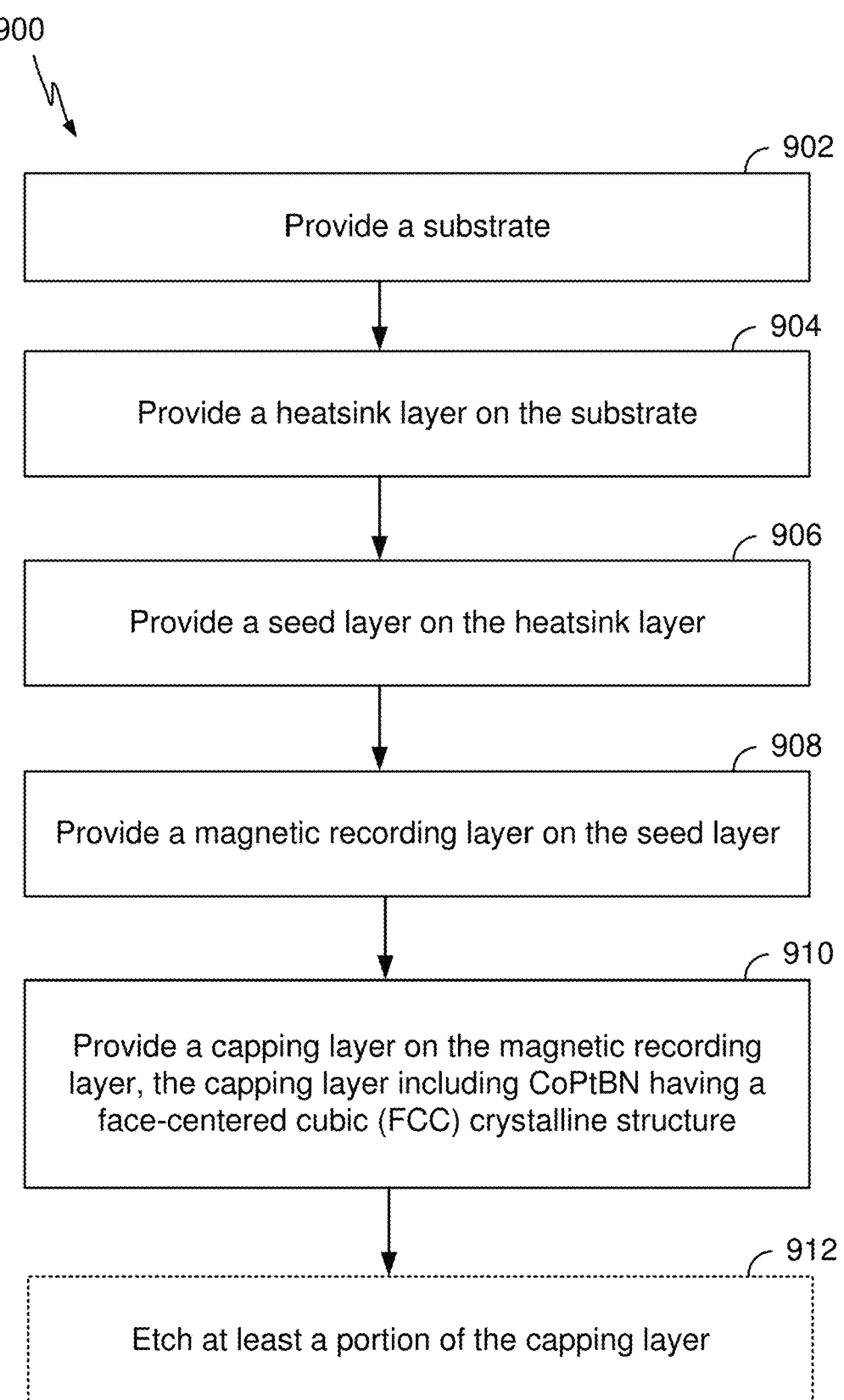
FIG. 9 is a flowchart of an exemplary process for fabricating a magnetic recording medium that includes a CoPtBN capping layer with an FCC crystalline structure, in accordance with an aspect of the disclosure.

FIG. 9 is a flowchart of a process 900 for fabricating magnetic recording medium in accordance with some aspects of the disclosure. In one aspect, process 900 can be used to fabricate the media described above in relation to FIG. 7. In block 902, the process provides a substrate. In block 904, the process provides a heatsink layer directly on the substrate. In block 906, the process provides a seed layer on the heatsink layer. In block 908, the process provides an MRL on the seed layer. In block 910, the process provides a capping layer on the magnetic recording layer, wherein the capping layer includes CoPtBN having an FCC crystalline structure. In (optional) block 912, at least a portion of the capping layer is etched. The medium that is fabricated may be a HAMR medium. In other examples, more or fewer layers may be formed or otherwise provided.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on. The term "about 'value X'", or "approximately value X," as used in the disclosure shall mean within 10 percent of the 'value X'. For example, a value of about 1 or approximately 1, would mean a value in a range of 0.9-1.1. In one aspect, "about" as used herein may instead mean 5 percent. In this disclosure, various numerical values are presented. Unless specifically indicated otherwise, it is contemplated that these numerical values may have a tolerance of 10 percent. In another aspect, the tolerance may be 5 percent. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. Various components described in this specification may be described as "including" or made of certain materials or compositions of materials. In one aspect, this can mean that the component consists of the particular material(s). In another aspect, this can mean that the component comprises the particular material(s).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium, comprising:
a substrate;
a heatsink layer on the substrate;
a seed layer on the heatsink layer;
a magnetic recording layer on the seed layer, wherein the magnetic recording layer comprises FePt with a $L1_0$ crystalline structure; and
a capping layer directly on the magnetic recording layer, wherein the capping layer comprises CoPtBN with Pt in the range of 5 to 12 atomic percentage (at. %) with a face-centered cubic (FCC) crystalline structure;
wherein the BN in the CoPtBN comprises 22 to 30 mole percentage of the CoPtBN; and
wherein the Co in the CoPtBN comprises 58 to 68 mole percentage of the CoPtBN.

2. The magnetic recording medium of claim 1, wherein the CoPtBN comprises 58Co-12Pt-30BN atomic percentage (at. %).

3. The magnetic recording medium of claim 1, wherein the CoPtBN comprises 65Co-5Pt-30BN atomic percentage (at. %).

4. The magnetic recording medium of claim 1, wherein the CoPtBN comprises 68Co-10Pt-22BN atomic percentage (at. %).

5. The magnetic recording medium of claim 1, wherein the capping layer has a multi-layer structure.

6. The magnetic recording medium of claim 5, wherein the multi-layer structure of the capping layer comprises two or more layers of CoPtBN, each with a different percentage of BN within the CoPtBN.

7. The magnetic recording medium of claim 5, wherein the multi-layer structure of the capping layer comprises:
a first layer comprising CoPtBN; and
a second layer comprising at least one of Co, CoPt, CoFe, or CoPd.

8. The magnetic recording medium of claim 5, wherein the multi-layer structure of the capping layer comprises:
a first layer comprising CoPtBN; and
a second layer comprising at least one of CoAu, CoAg, CoAl, CoCu, CoIr, CoMo, CoNi, CoOs, CoRu, CoTi, CoV, FeAg, FeAu, FeCu, FeMo, FePd, NiAu, NiCu, NiMo, NiPd, or NiRe.

9. The magnetic recording medium of claim 1, wherein a lattice mismatch between the capping layer and the magnetic recording layer is less than 9%.

10. The magnetic recording medium of claim 1, further comprising an amorphous soft underlayer (SUL) on the substrate with the heatsink layer on the amorphous SUL.

11. A data storage device comprising:
a slider comprising a magnetic recording head; and
the magnetic recording medium of claim 1,
wherein the slider is configured to write information to the magnetic recording layer of the magnetic recording medium during a write operation.

12. A method for fabricating a magnetic recording medium, the method comprising:
providing a substrate;
providing a heatsink layer on the substrate;
providing a seed layer on the heatsink layer;
providing a magnetic recording layer on the seed layer, wherein the magnetic recording layer comprises FePt with a $L1_0$ crystalline structure; and
providing a capping layer directly on the magnetic recording layer, wherein the capping layer comprises CoPtBN with Pt in the range of 5-12 atomic percentage (at. %) with a face-centered cubic (FCC) crystalline structure;
wherein the BN in the CoPtBN comprises 22 to 30 mole percentage of the CoPtBN; and
wherein the Co in the CoPtBN comprises 58 to 68 mole percentage of the CoPtBN.

13. The method of claim 12, further comprising etching portions of the capping layer.

14. The method of claim 13, wherein the CoPt of the capping layer forms capping layer grains and the BN of the capping layer forms segregants disposed between the grains, and wherein the etching is performed to planarize at least some of the capping layer grains.

15. The method of claim 12, wherein a lattice mismatch between the capping layer and the magnetic recording layer is less than 9%.

16. A magnetic recording medium, comprising:
a substrate;
a heatsink layer on the substrate;
a seed layer on the heatsink layer;
a magnetic recording layer on the seed layer, wherein the magnetic recording layer comprises FePt with a $L1_0$ crystalline structure; and a capping layer directly on the magnetic recording layer, wherein the capping layer comprises CoPtBN with Pt in the range of 5 to 12 atomic percentage (at. %) with a face-centered cubic (FCC) crystalline structure, and wherein the capping layer comprises capping grains and at least some of the capping grains are planarized;

wherein the BN in the CoPtBN comprises 22 to 30 mole percentage of the CoPtBN; and wherein the Co in the CoPtBN comprises 58 to 68 mole percentage of the CoPtBN.

17. The magnetic recording medium of claim 16, wherein the CoPtBN comprises at least one of 58Co-12Pt-30BN atomic percentage (at. %), 65Co-5Pt-30BN atomic percentage (at. %), or 68Co-10Pt-22BN atomic percentage (at. %).

18. The magnetic recording medium of claim 16, wherein the capping layer has a multi-layer structure.

19. The magnetic recording medium of claim 18, wherein the multi-layer structure of the capping layer comprises two or more layers of CoPtBN, each with a different percentage of BN within the CoPtBN.

20. The magnetic recording medium of claim 18, wherein the multi-layer structure of the capping layer comprises:

a first layer comprising CoPtBN; and a second layer comprising at least one of Co, CoPt, CoFe, or CoPd.

21. The magnetic recording medium of claim 18, wherein the multi-layer structure of the capping layer comprises:

a first layer comprising CoPtBN; and a second layer comprising at least one of CoAu, CoAg, CoAl, CoCu, CoIr, CoMo, CoNi, CoOs, CoRu, CoTi, CoV, FeAg, FeAu, FeCu, FeMo, FePd, NiAu, NiCu, NiMo, NiPd, or NiRe.

22. The magnetic recording medium of claim 16, further comprising an amorphous soft underlayer (SUL) on the substrate with the heatsink layer on the amorphous SUL.

23. A data storage device comprising:

a slider comprising a magnetic recording head; and the magnetic recording medium of claim 16, wherein the slider is configured to write information to the magnetic recording layer of the magnetic recording medium during a write operation.

24. The magnetic recording medium of claim 16, wherein a lattice mismatch between the capping layer and the magnetic recording layer is less than 9%.

* * * * *